(12) United States Patent
Dave et al.

(10) Patent No.: US 8,682,014 B2
(45) Date of Patent: Mar. 25, 2014

(54) AUDIO DEVICE WITH A VOICE COIL CHANNEL AND A SEPARATELY AMPLIFIED TELECOIL CHANNEL

(75) Inventors: Ruchir M. Dave, San Jose, CA (US); Shaohai Chen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/444,477

(22) Filed: Apr. 11, 2012

(65) Prior Publication Data

US 2013/0272555 A1  Oct. 17, 2013

(51) Int. Cl.
*H04R 25/00* (2006.01)

(52) U.S. Cl.
USPC .............. 381/317; 381/312; 381/315

(58) Field of Classification Search
USPC ............ 381/312–313, 315–318, 320–321
See application file for complete search history.

(56) References Cited

U.S. PATENT DOCUMENTS

| 7,787,648 | B1 | 8/2010 | Frerking et al. |
| 2006/0126873 | A1 | 6/2006 | Lee |
| 2009/0186653 | A1 | 7/2009 | Drader et al. |

OTHER PUBLICATIONS

Marshall, Bowen, "Technology Shows Promise in Reducing Telecoil Interference", The Hearing Journal, Oct. 2005, vol. 58, No. 10, (pp. 60, 61 & 64).

*Primary Examiner* — Suhan Ni
(74) *Attorney, Agent, or Firm* — Blakely, Sokoloff, Taylor & Zafman LLP

(57) ABSTRACT

A portable audio device has a voice coil audio signal processor in which a desired audio content signal is combined with an anti-noise signal produced by an active noise cancellation block. A voice coil amplifier receives a volume setting and is coupled to an output of the voice coil audio signal processor. A speaker is coupled to an output of the voice coil amplifier. In addition, a telecoil audio signal processor also receives the desired audio content, and feeds a telecoil amplifier that receives a telecoil coupling strength setting, followed by a telecoil. Other embodiments are also described and claimed.

7 Claims, 4 Drawing Sheets

AUDIO DEVICE WITH A VOICE COIL CHANNEL AND A SEPARATELY AMPLIFIED TELECOIL CHANNEL

BACKGROUND

A hearing aid is typically worn by someone who suffers from hearing loss, and can compensate for the hearing impairment by amplifying the local sound field. Hearing aids operate in either a microphone (acoustic) mode or a telecoil (inductive) mode. In the microphone mode, sound waves that are incident upon a microphone which is integrated in the hearing aid are converted an electrical audio signal. In the telecoil mode, an induction coil (also referred to as a telecoil or T-coil) which may also be inside the hearing aid picks up the local magnetic field that has been modulated by the receiver or a dedicated coil of a nearby telephone handset. In both modes, the resultant electrical audio signal that has been picked up is subsequently processed, amplified and then converted to sound (by a small speaker inside the hearing aid) that can be heard by the user.

Hearing aids do not always function well with some portable communication devices such as mobile phones. One problem experienced by those who wear hearing aids and have a mobile phone is that the microphone inside the hearing aid may pickup unwanted ambient acoustic noise from the surrounding background environment, in addition to the desired speech coming from the mobile phone receiver. This makes it difficult for the user to discern the desired speech. However, when the hearing aid is switched to its T-coil mode, the hearing aid microphone may be deactivated, and the T-coil is inductively coupled, via the local magnetic field, to the voice coil of the receiver in the mobile phone. As such, environmental or background acoustic noise is not amplified by the hearing aid, when the T-coil is being used as a pickup. Hearing aid compatible (HAC) mobile phones are becoming more commonly available to the public. In addition to the typical acoustic receiver, HAC phones may also include a separate magnetic field radiator, such as a loop of wire, also referred to as a telecoil or T-coil, specifically designed for inductively coupling with the T-coil of a nearby hearing aid. Such phones are thus compatible with both the microphone of a hearing aid, as well as its T-coil. These mobile phones may include a switch that enables a user to manually select a HAC mode of operation. In that mode of operation, the audio signal processing that is applied to a desired audio signal is modified to change the frequency response of the audio signal processing chain, so as to better accommodate the microphone of a hearing aid. Another change that may be made when the HAC mode has been selected is to allow the desired audio signal that is being applied to drive the voice coil of the receiver to also drive the telecoil that is inside the mobile phone.

A few mobile phones contain an active noise cancellation (ANC) block that is typically implemented using digital audio signal processing techniques, to help reduce or cancel out the acoustic background noise that may be heard by a user of the mobile phone. The ANC block attempts to cancel out the acoustic background noise by producing what is referred to as an anti-noise signal. The anti-noise signal is combined with the desired audio content, and then the receiver voice coil is driven with this combined signal. The goal is that the receiver will produce an anti-noise acoustic signal that should, in theory, cancel the acoustic background noise that otherwise would be heard by the user. This technology is also used in noise-canceling headphones.

SUMMARY

An embodiment of the invention is a portable audio device in which a desired audio signal is combined with an anti-noise signal. An earpiece speaker has a voice coil that is coupled to convert the combined signal into audible form, while producing a by-product magnetic field signal. A telecoil is coupled to convert the audio signal, but not the anti-noise signal, into a primary magnetic field signal. The primary magnetic field signal is designed to inductively couple with a telecoil of a hearing aid that may be worn by a user of the device. The primary magnetic field signal is stronger than the by-product magnetic field signal that is produced by the voice coil. This may be achieved by setting a suitably high telecoil coupling strength as the gain of a telecoil amplifier. This separation of the voice coil channel from the telecoil channel may allow the primary magnetic field signal produced by the telecoil channel, which signal includes the desired audio content but not the anti-noise, to essentially "drown out" the by-product magnetic field signal produced by the voice coil channel, which signal contains the anti-noise. Thus, the portable device can produce the desired audio content acoustically, while at the same time producing the desired anti-noise for acoustic coupling (e.g., when a smart phone is being held against the user's ear in a handset mode of operation), but at the same time also avoid the unnecessary inductive coupling of anti-noise into a hearing aid that is operating in its T-coil mode.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
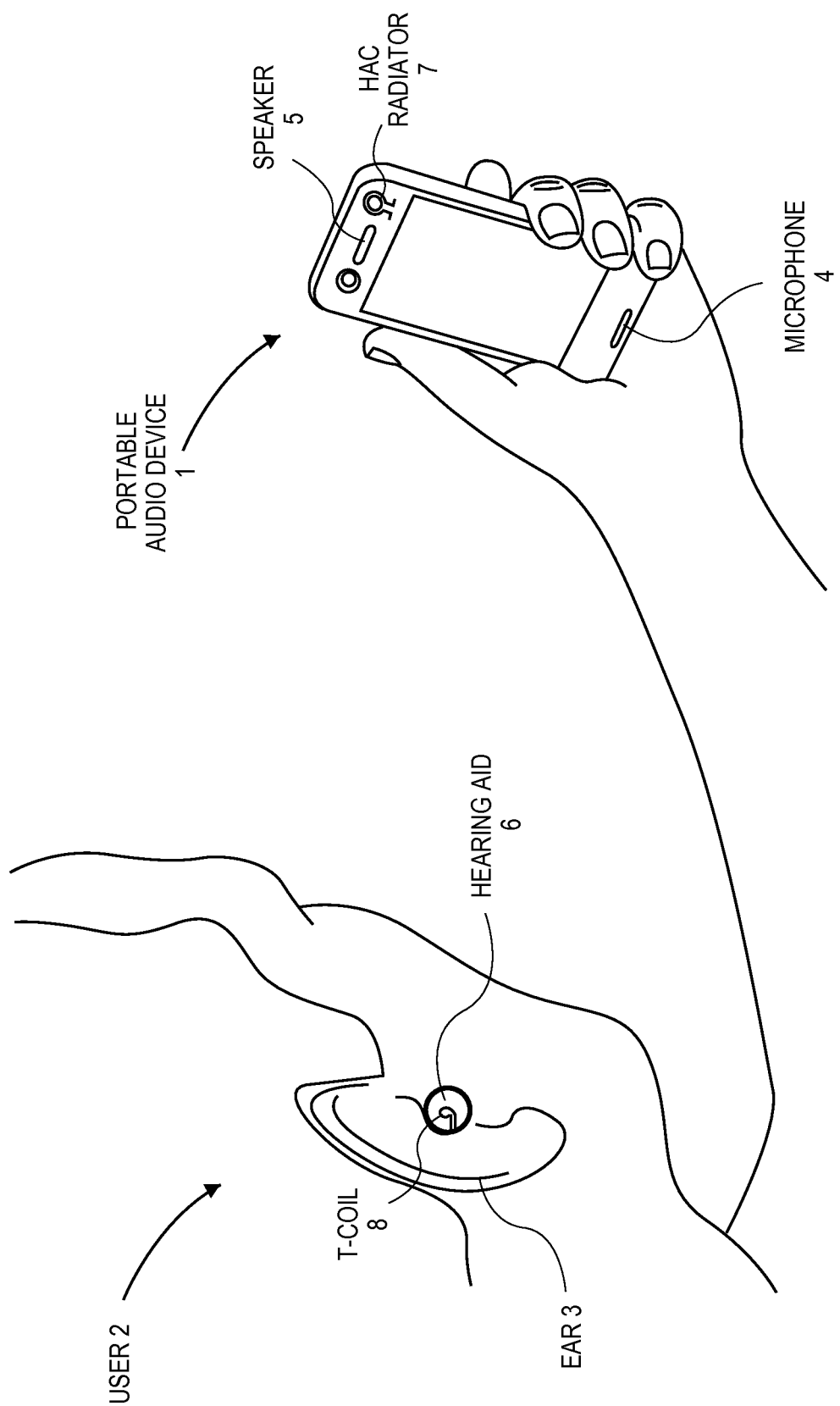
FIG. 1 illustrates a hearing impaired user holding an example portable audio device in his hand.
Figure 2:
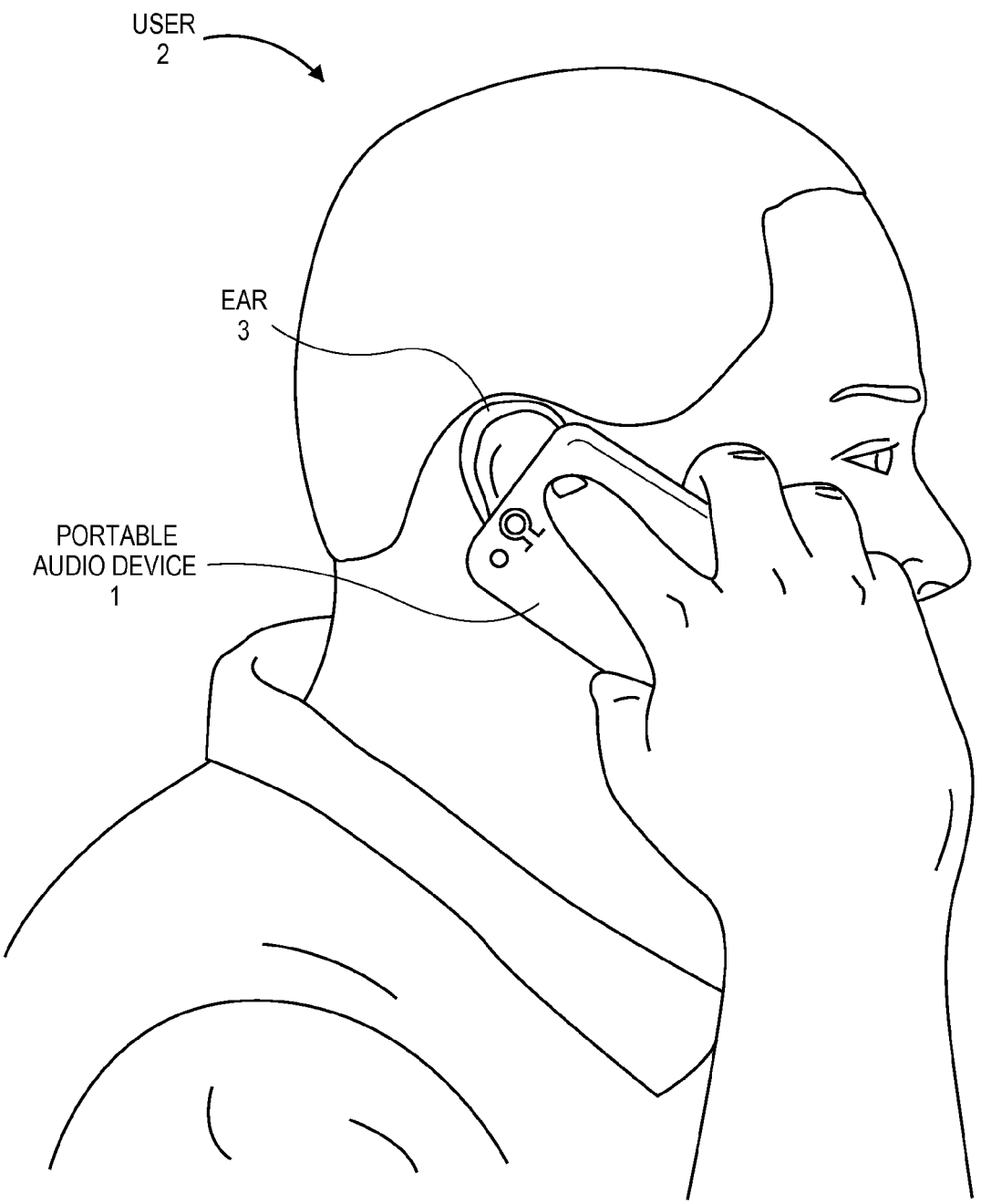
FIG. 2 illustrates the hearing impaired user placing the example portable audio device against his ear at which a hearing aid is located.

FIG. 1 illustrates a hearing impaired user 2 holding an example portable audio device 1 in his hand. The user 2 is wearing in his ear 3 a hearing aid 6, which contains a T-coil 8. The hearing aid 6 is one that can operate in either acoustic coupling mode in which a built-in microphone (not shown) is used to pickup local sound waves, or inductive coupling mode in which the audio pickup is by way of the local magnetic field waves and the T-coil 8. In an analogous manner, the portable audio device 1 has a speaker 5, which converts a desired audio signal into sound waves, and a hearing aid compatible (HAC) radiator 7, which converts the desired audio signal into a magnetic field wave. In this particular instance, the portable audio device 1 is a smart phone that also has a microphone 4 integrated into the handset housing, to pickup the voice of the user 2 thereby allowing the user to participate a two-way in real-time or live voice communication session (also referred to as a telephone call or a video call) with a far-end user over a mobile phone communications network (not shown), e.g. a cellular terrestrial radio access network, a satellite communications network, or a wireless local area network. FIG. 2 illustrates the user 2 placing the portable audio device 1 and in particular the acoustic port of the speaker 5 up against his ear 3 during the call, so as to better hear the voice of the far-end user.

Figure 3:
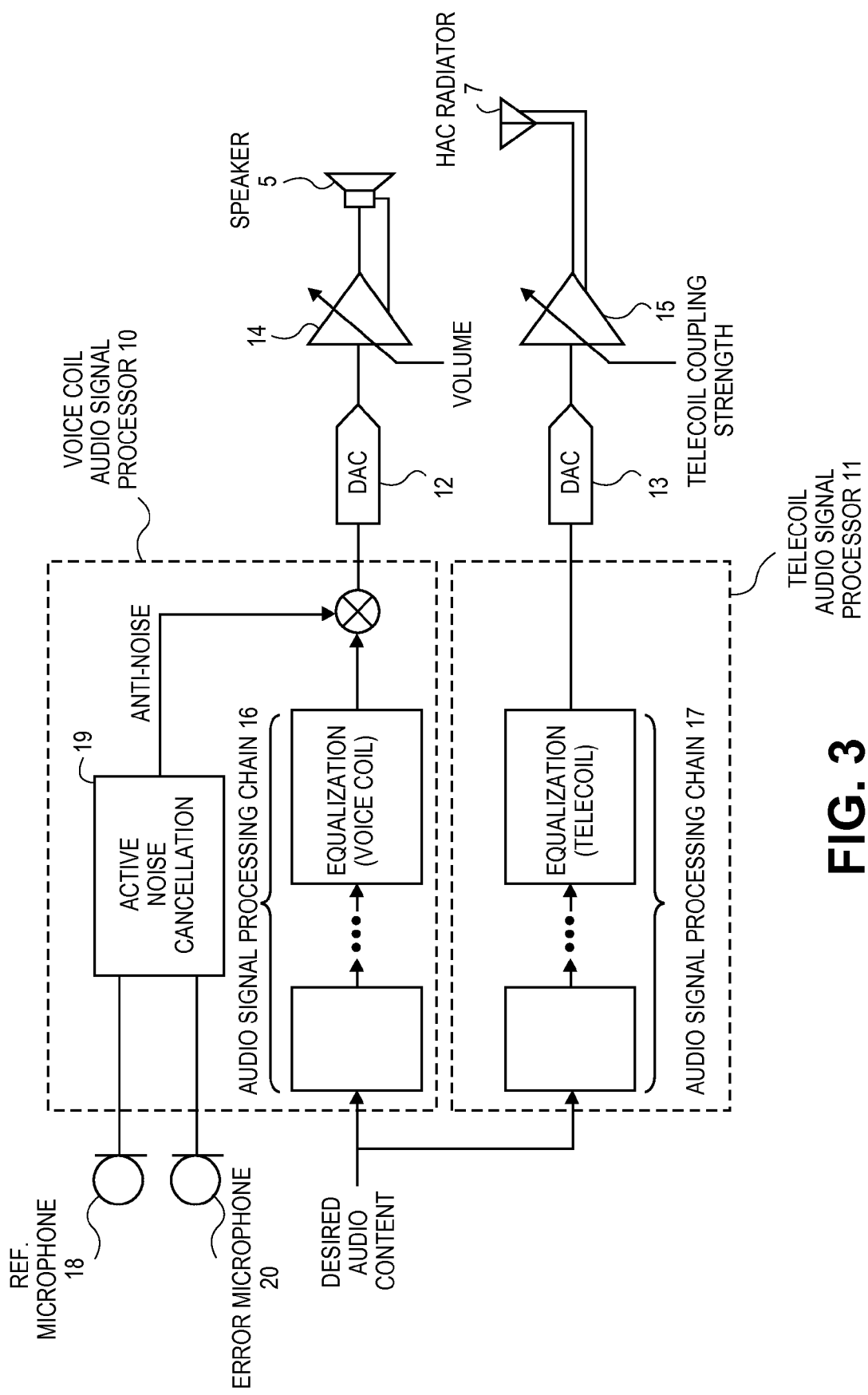
FIG. 3 is a block diagram of part of a portable audio device that includes a voice coil audio channel and a separate telecoil audio channel.

FIG. 3 is a block diagram of relevant portions of the portable audio device 1, depicting separate voice coil audio and telecoil audio channels that may operate in parallel or simultaneously upon the input desired audio content, e.g. during a call. In one embodiment, all of the components illustrated in FIG. 3 may be integrated within a single housing of the portable audio device 1 (e.g., a smart phone housing). Alternatively, the speaker 5 and/or the HAC radiator 7 may be outside the housing that contains most of the other components, and may be communicatively connected by a cable or wireless link to the other components. As seen, the desired audio content is fed to two separate channels simultaneously, including one that has a voice coil audio signal processor 10 and another having a telecoil audio signal processor 11.

The input to each of the signal processors 10, 11 may include an audio signal processing chain 16, 17 which in most cases may be implemented as one or more digital signal processing blocks either in the form of a software-programmed data processing element (one or more microprocessors) or as hardwired logic. For instance, both of the signal processors 11 may be implemented using the same hardware microprocessor, suitably programmed to perform the needed digital signal processing functions. These functions or blocks may include conventional filtering or signal enhancement operations such as automatic gain control, noise reduction, side tone mixing (in the case of a telephony device), and equalization. Note that the order in which the operations are applied to the desired audio content may not be significant as typically such audio processing stages are linear operations; however in some cases, non-linear operations may also be implemented such as limiting, compression and expansion, which may dictate a specific order.

The output signals of the audio signal processors 10, 11 are fed to their respective digital to analog converters (DACs) 12, 13. This is consistent with currently popular implementations of portable consumer electronic audio devices in which most of audio signal processing is performed in the digital domain, rather than in analog form. It is, however, possible to implement some of the audio signal processing functions of the processors 10, 11 in the analog domain. After conversion into analog form, the audio signals are then fed to their respective power amplifiers 14, 15. The voice coil power amplifier 14 is a variable amplifier that receives a volume setting, which may be manually set by the user 2 through any conventional technique (e.g., a mechanical volume switch and button exposed on the outside of the housing of the device 1). The telecoil amplifier 15 may or may not be variable. It could receive a telecoil coupling strength setting (which may be variable) and that may be set automatically by, for instance, a software process running in the device 1, e.g. as part of a telephony application program 28—see FIG. 4. The setting could also be set manually, by the user (e.g., variable and pegged to the adjustable volume setting). The setting could alternatively be fixed at the factory based on testing with expected hearing aids and volume settings. An output of the telecoil amplifier 15 is coupled to drive the HAC radiator 7, while an output of the voice coil amplifier 14 is coupled to drive the speaker 5. In most cases, the speaker 5 would be an earpiece speaker such as a receiver in a mobile phone handset, or an earphone in a headset (not shown). In most instances, the HAC radiator 7 may be integrated next to the speaker 5 within the same housing of the device 1 and suitably oriented (if possible) for improved inductive coupling with a nearby hearing aid T-coil.

To enhance compatibility with a hearing aid, the telecoil amplifier 15 should have a gain setting that represents a telecoil coupling strength that results in a stronger magnetic field signal being produced by the HAC radiator 7, that is stronger than a magnetic field signal that is being simultaneously produced by a voice coil of the speaker 5. In other words, while the desired audio content is being processed by each channel, where the voice coil channel is producing sound and the HAC radiator 7 is producing a magnetic field wave (both of which contain the desired audio), the strength of the magnetic field wave produced by the HAC radiator 7 should be greater than that of the "by-product" magnetic field produced by a voice coil of the speaker 5, so that the by-product magnetic field is essentially drowned out by the "primary" magnetic field wave produced by the HAC radiator 7. The latter is, of course, used for inductive coupling with a counterpart T-coil of a nearby hearing aid worn by the user 2.

A purpose of making the primary magnetic field stronger is to mask "anti-noise" that may be present in the by-product magnetic field (that is produced by the voice coil channel). Indeed, in some portable audio devices such as mobile phones, an active noise cancellation (ANC) block 19 is present (see FIG. 3) which produces a so-called anti-noise signal, using background sound picked up by a so-called reference microphone 18, and using an error microphone 20 to pick up the sound in the user's ear. The ANC block 19 serves to reduce unwanted sound (typically background sound) that could be heard by the user 2. It does so by creating, through the speaker 5, a sound pressure wave that is adapted to have an inverted phase or anti-phase, relative to the original unwanted (background) sound. The anti-noise and the background sound should thus combine in an interference manner, in order to effectively cancel each other out. Of course, in a practical situation, the background sound as a result is not completely canceled but may be so faint as to be inaudible to the user's ear. The anti-noise signal is combined or mixed with the output of the audio signal processing chain 16 in the voice channel, but not in the telecoil channel. The voice channel thus produces not just the desired audio in acoustic form, but also an acoustic anti-noise, which is desirable in that it is intended to cancel any background acoustic noise surrounding the user 2. Note especially however that the anti-noise signal is absent from the telecoil channel, as shown.

Still referring to FIG. 3, an embodiment of the invention as depicted therein may be described as follows. The speaker 5, which may be an earpiece speaker (such as a receiver), has a voice coil (not shown) that converts into audible form, while producing a by-product magnetic field signal, a desired audio signal. The desired audio content may be the downlink speech of a far-end user. Note that the desired audio signal has been combined (in this case digitally within the voice coil audio signal processor 10) with an anti-noise signal, so that the by-product magnetic field also contains the anti-noise. If this anti-noise is picked up by the T-coil of a nearby hearing aid and then converted to sound, the hearing aid user may not clearly hear the desired audio content.

To enable the hearing aid user to clearly hear the desired audio content that is being picked up by the hearing aid T-coil, the by-product magnetic field of the voice coil of the speaker can be masked, as follows. A hearing aid compatibility circuit converts the desired audio, and not the anti-noise, into a primary magnetic field signal, for coupling with the hearing aid T-coil (not shown). As shown in FIG. 3, the hearing aid compatibility circuit may include a telecoil equalization block (within the audio signal processing chain 17) that receives the desired audio signal, a DAC 13 that is coupled to an output of the equalization block, a telecoil amplifier 15 that is coupled to an output of the DAC 13, and the HAC radiator 7 which is coupled to an output of the amplifier. Driving the HAC radiator 7 in this manner produces the primary magnetic field signal, which is stronger than the by-product magnetic field signal that is simultaneously being produced by the voice coil of the speaker 5. In this way, any anti-noise that appears in the by-product magnetic field signal is drowned out by the stronger primary magnetic field (which contains the desired audio content). To ensure sufficient strength of the primary magnetic field, a telecoil coupling strength value, that represents the strength of inductive coupling with a hearing aid T-coil, should be set sufficiently high, to set the corresponding gain of the telecoil amplifier 15. In most instances, the HAC radiator 7 (also referred to as a telecoil) may be positioned next to the speaker 5 within the housing of the portable audio device 1, in such a way as to further enhance the chances of drowning out the by-product magnetic field of the speaker 5.

A further enhancement, for compliance with a hearing aid operating in T-coil mode, is to design the telecoil equalization block (within the telecoil audio signal processor 11) to have a frequency response that is designed to enhance inductive coupling of the HAC radiator 7 and the hearing aid T-coil. This is in contrast to the equalization block that is within the voice coil audio signal processor 10, whose frequency response should instead be designed to enhance acoustic coupling between the speaker 5 and the ear of the user. In other words, the voice coil equalization shapes the spectral content of the desired audio signal to suit acoustic coupling with a microphone of the hearing aid (via the speaker 5), while the telecoil equalization block shapes the spectral content of the desired audio signal (in a parallel channel) to suit inductive coupling with the hearing aid coil (via the HAC radiator 7).

Figure 4:
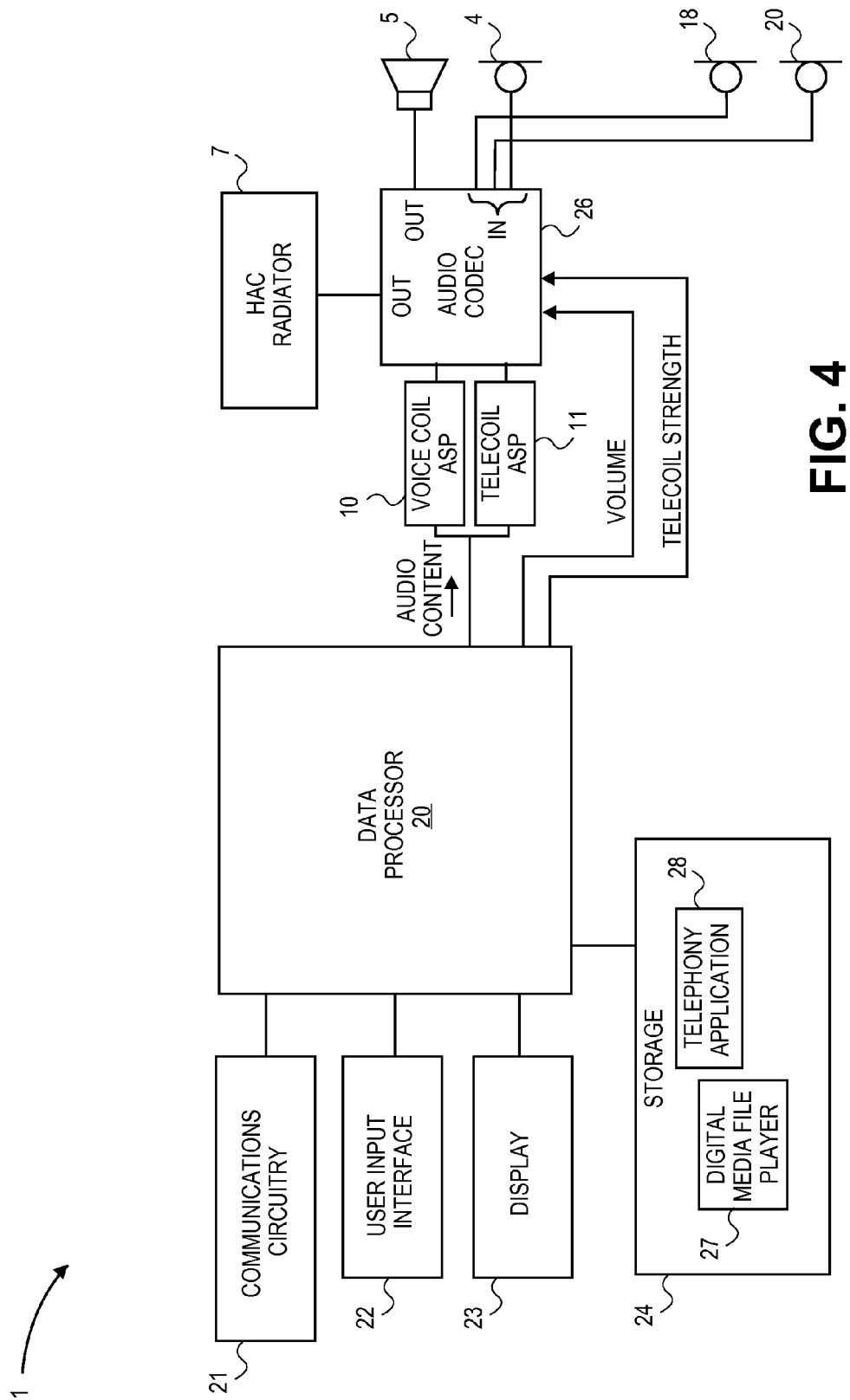
FIG. 4 is a block diagram of some of the constituent components of an example portable audio device, being a smart phone.

Turning now to FIG. 4, a block diagram of some of the constituent components of an example portable audio device 1, being a smart phone, is shown. The smart phone may be an iPhone™ device by Apple Inc. The smart phone includes a data processor 20, which may be a central processing unit, an applications processor, or a system on a chip (SoC) that executes an operating system and application programs, such as digital media file player 27 and a telephony application 28. The programs may be in a data storage 24 within the housing of the device 1, e.g. as part of non-volatile memory such as flash memory. Of course, there may be other applications in the storage 24 including, for instance, email, calendar, and video games. The user of the portable audio device 1 is presented information visually on a display 23 (e.g., a liquid crystal display panel), and can enter information or interact through a user input interface 22. The latter may be based on a physical keyboard or keypad, or it may be a virtual keyboard that is implemented using a touch screen that incorporates the display 23. Communications with external devices occurs through communications circuitry 21, which may include mobile phone network communications circuitry such as a cellular terrestrial radio access network transceiver and baseband processor, a wireless local area network interface, or a short-range RF interface such as a Bluetooth compatible interface. In those instances, the communications circuitry 21 receives the desired audio signal from, for instance, a wireless base station or other external RF transceiver, as part of what is typically referred to as a downlink signal. The downlink signal contains speech of a far-end user during a telephone or video call. The call is conducted or managed by the processor 20, as programmed by the telephony application 28. Alternatively, the downlink signal contains music or other audio being sent from a remote file server, as conducted or managed by the digital media file player application 27.

The desired audio content may be provided by the data processor 20 (or alternatively by another processor, such as the baseband processor in the case of a cellular phone device), simultaneously (e.g., synchronized) and in digital form, to the voice coil and telecoil audio signal processors 10, 11. In addition, the programmed data processor 20 would supply a variable volume setting and in some cases a variable telecoil strength setting, to the voice and telecoil amplifiers 14, 15. The latter may be implemented in an audio codec 26, which is an integrated circuit that acts as an interface between the digital audio domain and the analog audio domain. In this case, the audio codec 26 also interfaces with the HAC radiator 7, by housing the telecoil amplifier 15 (see FIG. 3).

While not shown in FIG. 4, the voice coil audio signal processor 10 also produces the anti-noise signal (such as described above in connection with FIG. 3). The anti-noise may have been combined digitally with the desired audio content, prior to being delivered to the audio codec 26. The latter would include the DAC 13 and the telecoil amplifier 15, which drives the combined signal through its output port into the connected speaker 5. The audio codec 26 may also include a separate input port to receive the desired audio content (anti-noise absent) from the telecoil signal processor 10. Coupled to this separate input port (also inside the audio codec 26) may be the DAC 12 and voice coil amplifier 14 of FIG. 3, which then simultaneously drive the HAC radiator 7 through a separate output port. Other implementations of the hearing aid compatibility circuit are possible.

Referring back to FIG. 3, the voice coil audio signal processor 10 and the telecoil audio signal processor 11 may be implemented as part of a mobile RF communications base band processor chip. Alternatively, one or both of those audio signal processors 10, 11 may be implemented as separate or dedicated digital audio processing chips. As yet another alternative, the audio processing performed by the telecoil equalization block (of the telecoil processor 11) may be separately performed by the data processor 20 (e.g., in accordance with program code that is part of the telephony app 28 for instance). The resultant processed desired audio signal is then provided to the audio codec 26, properly synchronized, of course, with the desired audio content from the voice coil audio signal processor 10.

While certain embodiments of the invention have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the portable audio device 1 depicted in FIG. 1 and FIG. 2 is a smart phone, the hearing aid compatible circuitry may alternatively be in an active/acoustic noise canceling headset. The description is thus to be regarded as illustrative instead of limiting.

What is claimed is:

1. A portable audio device comprising:
   a voice coil audio signal processor coupled to receive desired audio content, wherein the voice coil audio signal processor comprises an audio signal processing chain whose output signal is combined with an anti-noise signal produced by an active noise cancellation block to yield a combined audio signal;
   a telecoil audio signal processor coupled to receive the desired audio content and produce a telecoil signal;
   a voice coil amplifier having an input coupled to an output of the voice coil audio signal processor to amplify the combined audio signal in accordance with a volume setting;
   a speaker coupled to an output of the voice coil amplifier;
   a telecoil amplifier having an input coupled to an output of the telecoil audio signal processor to amplify the telecoil signal in accordance with a telecoil coupling strength setting; and
   a telecoil coupled to an output of the telecoil amplifier.

2. The portable audio device of claim 1 wherein the desired audio content comprises downlink speech of a far-end user, the portable audio device further comprising wireless communications circuitry to receive the downlink speech from a wireless base station.

3. The portable audio device of claim 1 further comprising:
   a voice coil digital to analog converter (DAC) to receive an output signal of the voice coil audio signal processor; and
   a telecoil DAC to receive an output signal of the telecoil audio signal processor.

4. The portable audio device of claim 1 wherein the audio signal processing chain in the voice coil audio signal processor comprises an equalization block whose frequency response is designed to enhance acoustic coupling between the speaker and an ear of a human user, and the telecoil audio signal processor comprises an equalization block whose frequency response is designed to enhance inductive coupling of the telecoil with a hearing aid T-coil.

5. The portable audio device of claim 1 wherein the telecoil amplifier is programmable with variable gain that represents a telecoil coupling strength that is selected to produce a magnetic field signal by the telecoil that is stronger than a magnetic field signal produced by the speaker.

6. A method in a portable audio device, comprising:
   receiving a desired audio signal;
   generating an anti-noise signal;
   converting the desired audio signal, and not the anti-noise signal, into a primary magnetic field; and
   converting the desired audio signal and the anti-noise signal into acoustic form, wherein the acoustic conversion produces a secondary magnetic field that is weaker than the primary magnetic field.

7. The method of claim 6 further comprising:
   amplifying the desired audio signal, prior to converting it into the primary magnetic field, in accordance with a gain setting that is intended to produce the primary magnetic field signal as being stronger than the secondary magnetic field signal.

* * * * *